United States Patent
Shibuya et al.

[11] Patent Number: 6,124,648
[45] Date of Patent: Sep. 26, 2000

[54] MOLDING MACHINE

[75] Inventors: Hiroshi Shibuya; Satoshi Nishida; Tokuzou Sekiyama; Satoru Matsubara, all of Gunma; Atsushi Koide, Nagano, all of Japan

[73] Assignees: Nissei Plastic Industrial Co., Ltd., Nagano-Ken; Nisso Electric Company, Gunma-Pref, both of Japan

[21] Appl. No.: 09/300,512

[22] Filed: Apr. 28, 1999

[30] Foreign Application Priority Data

May 1, 1998 [JP] Japan ................................. 10-122230

[51] Int. Cl.[7] .................................................. H02K 41/00
[52] U.S. Cl. .............................. 310/12; 310/13; 310/14; 310/152; 425/3; 335/281
[58] Field of Search ........................ 425/3, 174.8 R, 425/DIG. 33; 335/281, 220, 255; 310/12, 13, 14, 15, 152, 156

[56] References Cited

U.S. PATENT DOCUMENTS

| | | | |
|---|---|---|---|
| 4,152,570 | 5/1979 | Inoue et al. | 310/12 |
| 4,242,606 | 12/1980 | Nonnenmann | 310/12 |
| 4,669,013 | 5/1987 | Scranton et al. | 310/13 |
| 5,470,592 | 11/1995 | Steger | 425/3 |
| 5,661,446 | 8/1997 | Anderson et al. | 310/13 |
| 5,868,978 | 2/1999 | Kadoriku et al. | 264/40.5 |
| 5,897,815 | 4/1999 | Quichaud et al. | 264/28 |

FOREIGN PATENT DOCUMENTS 61-154822  7/1986  Japan.

*Primary Examiner*—Nestor Ramirez
*Assistant Examiner*—Saeed Ghahramani
*Attorney, Agent, or Firm*—Birch, Stewart, Kolasch & Birch, LLP

[57] ABSTRACT

A molding machine includes a drive unit for linearly moving a movable body, such as a movable platen of a clamping apparatus. The drive unit includes a linear motor. The linear motor includes a linear movement body having moving-side magnetic-pole portions and supported in an axially movable manner, and a stationary body having stationary-side magnetic-pole portions adapted to linearly move the linear movement body. The linear movement body is connected to the movable body (movable platen). The linear movement body has moving-side inclined surfaces on which part of the moving-side magnetic-pole portions are disposed. The stationary body has stationary-side inclined surfaces which face the moving-side inclined surfaces and on which part of the stationary-side magnetic-pole portions are disposed.

6 Claims, 6 Drawing Sheets

MOLDING MACHINE

BACKGROUND OF THE INVENTION

1. Field of the Invention

The present invention relates to a molding machine equipped with a drive unit for linearly moving a movable body, such as a movable platen of a clamping apparatus.

2. Description of the Relevant Art

A clamping apparatus (molding machine) equipped with a drive unit employing a linear motor for reciprocating a movable platen which supports a movable mold is disclosed in, for example, Japanese Patent Application Laid-Open (kokai) No. 61 (1986)-154822. The disclosed clamping apparatus employs a linear motor and an electromagnet. The linear motor is adapted to reciprocate the movable platen in order to open/close a mold. The electromagnet is adapted to apply high pressure to the mold for clamping purpose.

However, such a clamping apparatus involves the following problems.

First, since clamping is effected by the electromagnet, a clamping pressure cannot be controlled with a high degree of accuracy. Because of poor controllability, a series of clamping operation cannot be controlled precisely and smoothly.

Second, since the drive unit employs mutually independent commercial linear motor and electromagnet, the number of components increases. As a result, the overall structure of a molding machine becomes complicated and increases in size, resulting in an increase in overall cost.

SUMMARY OF THE INVENTION

An object of the present invention is to provide a molding machine capable of controlling pressure with a high degree of accuracy and precisely and smoothly controlling a series of operations.

Another object of the present invention is to provide a molding machine capable of reducing the number of components, implementing a simpler, more compact structure, and achieving cost reduction.

To achieve the above objects, a molding machine of the present invention comprises a drive unit for linearly moving a movable body, such as a movable platen of a clamping apparatus. The drive unit comprises a linear motor. The linear motor comprises a linear movement body having a moving-side magnetic-pole portion and supported in an axially movable manner, and a stationary body having a stationary-side magnetic-pole portion adapted to linearly move the linear movement body. The linear movement body is connected to the movable body (movable platen). The linear movement body has a moving-side inclined surface on which part of the moving-side magnetic-pole portion is disposed. The stationary body has a stationary-side inclined surface which faces the moving-side inclined surface and on which part of the stationary-side magnetic-pole portion is disposed.

For example, in an injection molding machine equipped with a clamping apparatus, the linear movement body of the thus-configured drive unit is connected to a movable platen of the clamping apparatus. During mold closing/opening at high speed, speed control of the linear movement body (movable platen) is performed primarily by the moving-side magnetic-pole portion of the linear movement body excluding the moving-side inclined surface and the stationary-side magnetic-pole portion of the stationary body excluding the stationary-side inclined surface. During mold clamping at high pressure, pressure control of the linear movement body (movable platen) is performed primarily by the moving-side magnetic-pole portion of the moving-side inclined surface and the stationary-side magnetic-pole portion of the stationary-side inclined surface.

DETAILED DESCRIPTION OF THE PREFERRED EMBODIMENT

An embodiment of the present invention will next be described in detail with reference to the drawings. The accompanying drawings are illustrative of the embodiments and are not meant to limit the scope of the invention. In order to clarify the invention, detailed description of known parts is omitted.

A molding machine according to a first embodiment, i.e., an in-line screw injection molding machine M, will be described with reference to FIGS. 1 to 7.

Figure 1:
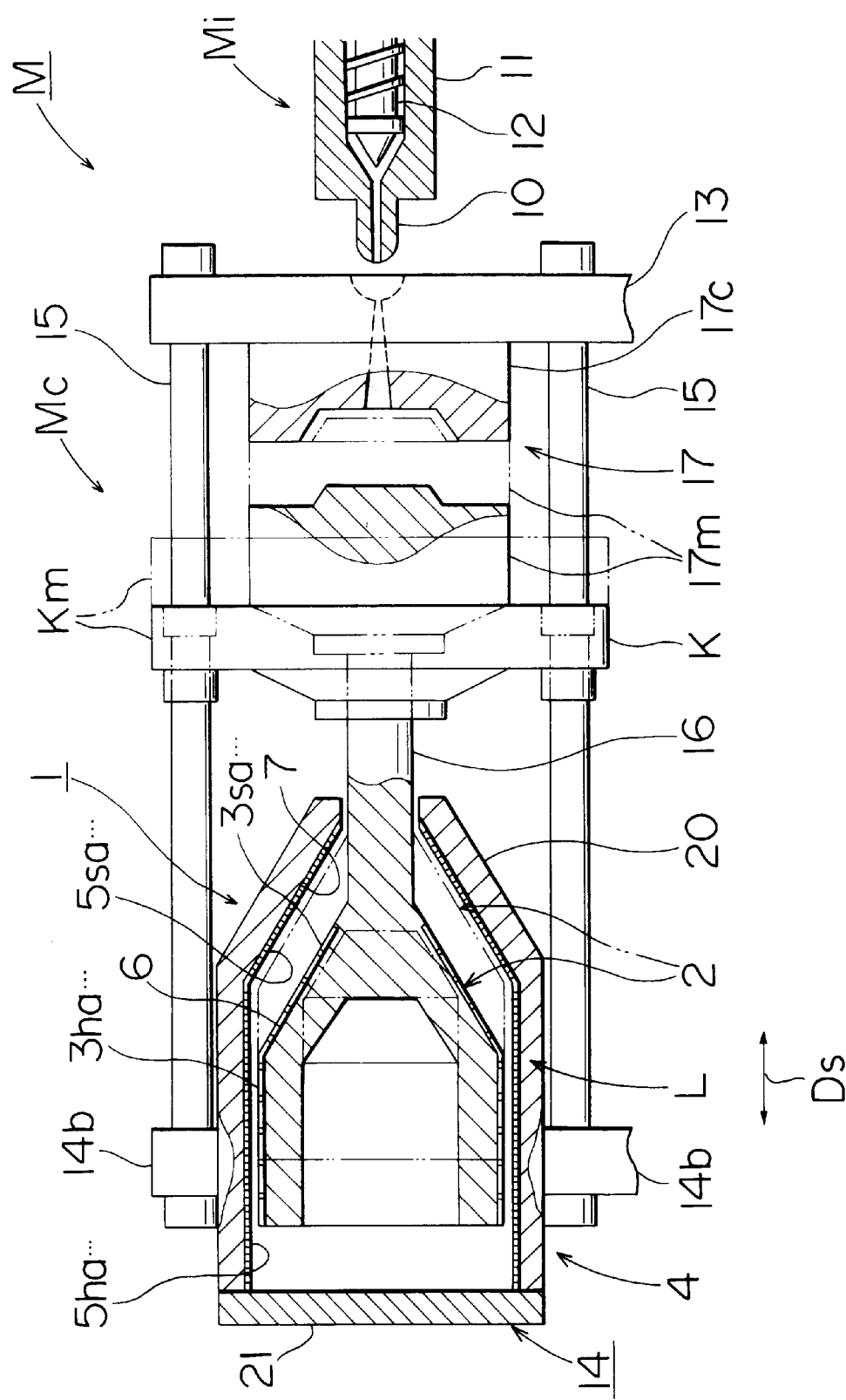
FIG. 1 is a partially sectional side view showing a portion of an in-line screw injection molding machine according to an embodiment of the present invention.

FIG. 1 shows an in-line screw injection molding machine M which includes an injection apparatus Mi and a clamping apparatus Mc. The injection apparatus Mi includes a heating cylinder 11 having an injection nozzle 10 located at the tip thereof and a hopper located at a rear portion. A screw 12 is inserted into the heating cylinder 11 such that it can undergo rotation and reciprocating motion therein. The injection nozzle 10 is brought into contact with an assembly of the clamping apparatus Mc and a mold, and a molten resin is injected and charged into the mold clamped by the clamping apparatus Mc.

The clamping apparatus Mc includes a stationary platen 13 standing on the side of the injection apparatus Mi and a drive block 14 located away from the stationary platen 13 and disposed in such a manner as to face the stationary platen 13. Four brackets 14b are provided on the peripheral surface of the drive block 14. Four tie bars 15 extend between the corresponding brackets 14b and the stationary platen 13. A movable platen Km (movable body K) is slidably mounted on the tie bars 15. An output shaft 16 of a drive unit 1 provided in the drive block 14 is connected to a rear face of the movable platen Km. Reference numeral 17 denotes a mold which includes a movable mold 17m and a stationary mold 17c. The movable mold 17m is mounted on the movable platen Km, and the stationary mold 17c is mounted on the stationary platen 13.

The drive unit 1 will next be described in detail with reference to FIGS. 2 to 7. The drive unit 1 includes a linear motor L for linearly moving the movable platen Km. The linear motor L functions as a three-phase AC servomotor and includes a linear movement body 2 supported such that it can move in axial direction Ds, and a stationary body 4 adapted to linearly move the linear movement body 2. The stationary body 4 includes a casing 20. The casing 20 assumes a tubular shape of square cross section, and a front portion thereof is reduced in size toward its front end to form a tetragonal pyramid. A rear cover 21 is attached to the rear end face of the casing 20.

An armature portion 25 including stationary-side magnetic-pole portions 5sa, 5sb, 5sc, . . . , 5ha, 5hb, 5hc, . . . is provided on the interior upper surface of the casing 20. A front portion of the interior upper surface of the casing 20 forms a stationary-side inclined surface 7, and the remaining portion of the interior upper surface of the casing 20 forms a stationary-side parallel surface 26. The stationary-side magnetic-pole portions 5sa, 5sb, 5sc . . . are arranged on the stationary-side inclined surface 7, whereas the remaining stationary-side magnetic-pole portions 5ha, 5hb, 5hc, . . . are arranged on the stationary-side parallel surface 26. An armature portion 27 is also similarly configured on the interior lower surface of the casing 20. A configuration of the lower armature portion 27 is the mirror image of the above-described configuration of the upper armature portion 25.

Figure 2:
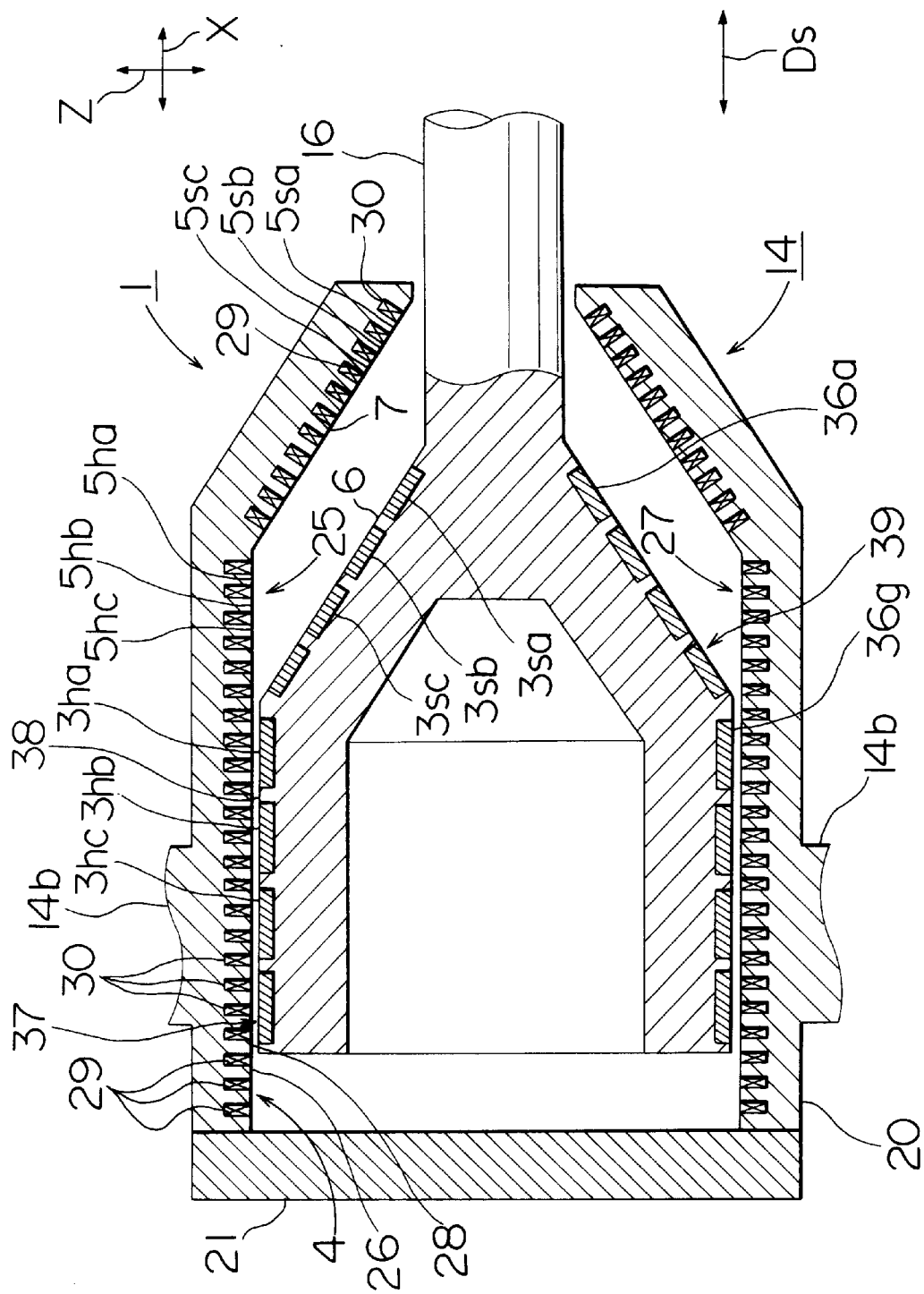
FIG. 2 is a sectional side view of a drive unit provided on the molding machine of FIG. 1.
Figure 4:
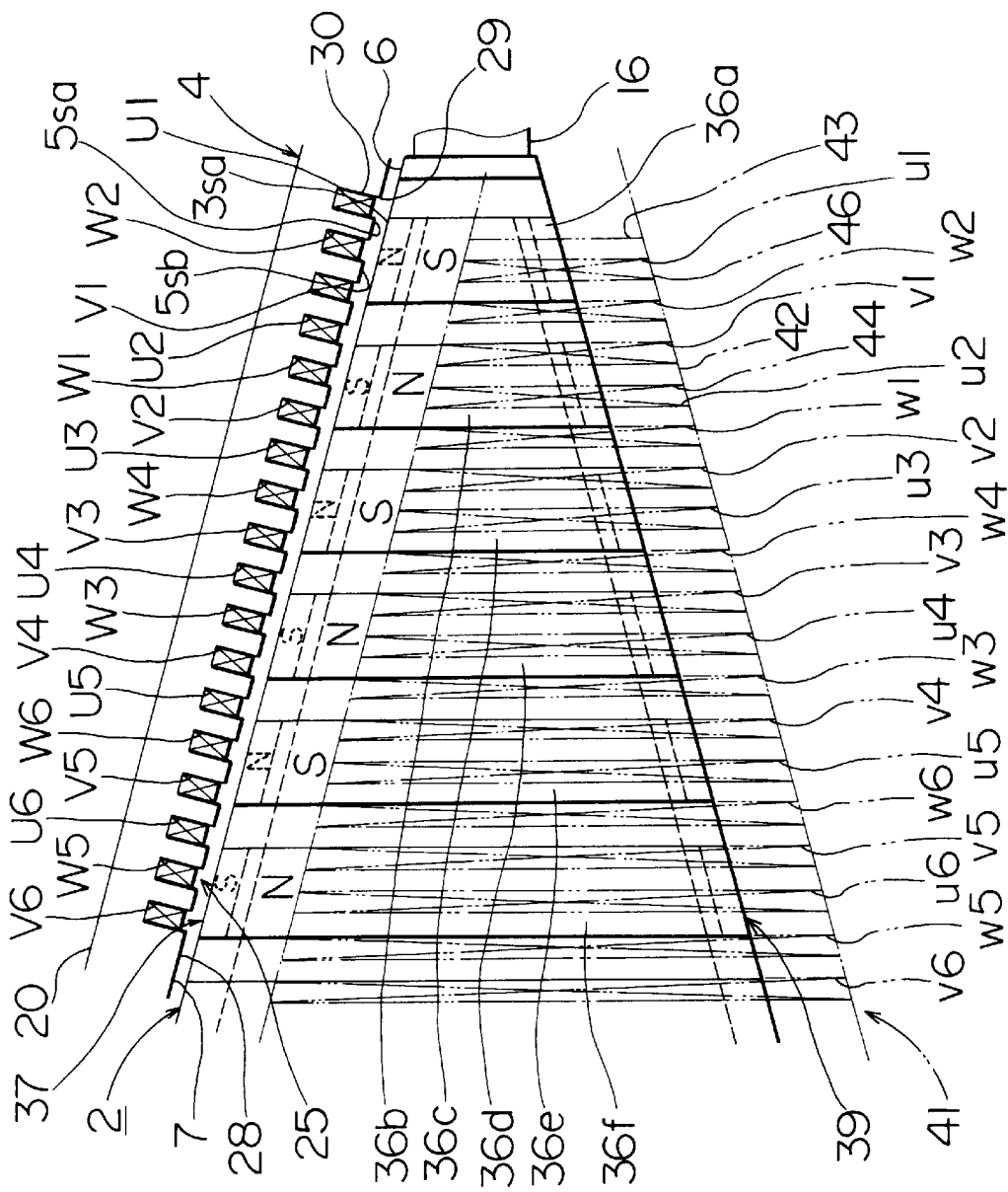
FIG. 4 is a right-hand side view showing a front portion of the linear movement body of the molding machine of FIG. 1 and a front portion of the stationary body of the molding machine of FIG. 1 represented partially by an imaginary line.

The specific configuration of the armature portion 25 is next described. A plurality of comb-shaped silicon steel plates are superposed in direction Y to form a laminated armature core 28. A front portion of the interior surface of the armature core 28 forms the stationary-side inclined surface 7 described above. A total of 18 slots 29 are formed in the stationary-side inclined surface 7 at predetermined intervals in axial direction Ds (direction X), and many slots 29 are similarly formed in the stationary-side parallel surface 26. The number of slots 29 is selected according to the specific application. FIGS. 1 and 2 schematically show a number of slots 29. Three-phase (U phase, V phase, and W phase) armature coils 30 are wound in the corresponding slots 29 formed in the armature core 28. The armature coils 30 each include a U-phase armature coil, a V-phase armature coil, and a W-phase armature coil, each being shifted by an electrical angle of 120°. Specifically, as shown in FIG. 4, the first U-phase armature coil is wound from slot U1 toward slot U2; the second U-phase armature coil is wound from slot U3 toward slot U4; and the third U-phase armature coil is wound from slot U5 toward slot U6. The first V-phase armature coil is wound from slot V1 toward slot V2; the second V-phase armature coil is wound from slot V3 toward slot V4; and the third V-phase armature coil is wound from slot V5 toward slot V6. The first W-phase armature coil is wound from slot W1 toward slot W2; the second W-phase armature coil is wound from slot W3 toward slot W4; and the third W-phase armature coil is wound from slot W5 toward slot W6. FIG. 4 shows only the stationary-side inclined surface 7, but the stationary-side parallel surface 26 and the armature portion 27 are configured similarly.

The linear movement body 2 includes a housing 35 that assumes a tubular shape of square cross section. A front portion of the housing 35 is reduced in size toward its front end to form a tetragonal pyramid. Magnetic elements 36a to 36f, 36g . . . are arranged at predetermined intervals on the outer surface of the linear movement body 2 and are magnetically isolated from each other by the housing 35 of non-magnetic material. The magnetic elements 36a to 36f, 36g . . . each assume the form of a square frame. Thus, a field pole portion 37 is formed on the outer upper surface of the housing 35. Moving-side magnetic-pole portions 3sa, 3sb, 3sc, . . . , 3ha, 3hb, 3hc, . . . are generated in the field pole portion 37. A front portion of the outer upper surface of the housing 35 forms a moving-side inclined surface 6, and the remaining portion of the outer upper surface of the housing 35 forms a moving-side parallel surface 38. The moving-side inclined surface 6 faces the stationary-side inclined surface 7, and the moving-side parallel surface 38 faces the stationary-side parallel surface 26. The moving-side magnetic-pole portions 3sa, 3sb, 3sc . . . are arranged on the moving-side inclined surface 6, whereas the remaining moving-side magnetic-pole portions 3ha, 3hb, 3hc, . . . are arranged on the moving-side parallel surface 38. A field pole portion 39 is similarly configured on the outer lower surface of the housing 35. A configuration of the lower field pole portion 39 is the mirror image of the above-described configuration of the upper field pole portion 37.

A field-generating portion 41 is provided on the interior right-hand surface of the casing 20. The field-generating portion 41 is adapted to magnetize the magnetic elements 36a to 36f, 36g . . . so as to generate the moving-side magnetic-pole portions 3sa, 3sb, 3sc, . . . , 3ha, 3hb, 3hc, . . . A plurality of comb-shaped silicon steel plates are superposed in direction Z (FIG. 2) to form a laminated field core 42. A front portion of the interior surface of the field core 42 forms a stationary-side inclined surface 43, and the remaining portion of the interior surface of the field core 42 forms a stationary-side parallel surface 45. A total of 18 slots 44 are formed in the stationary-side inclined surface 43 at predetermined intervals in axial direction Ds, and many slots 44 are similarly formed in the stationary-side parallel surface 45. The number of slots 44 is selected according to specifications of application. Three-phase (u phase, v phase, and w phase) field coils 46 are wound in the corresponding slots 44 formed in the field core 42. The field coils 46 each include a u-phase field coil, a v-phase field coil, and a w-phase field coil, each being shifted by an electrical angle of 120°. Specifically, the first u-phase field coil is wound from slot u1 toward slot u2; the second u-phase field coil is wound from slot u3 toward slot u4; and the third u-phase field coil is wound from slot u5 toward slot u6. The first v-phase field coil is wound from slot v1 toward slot v2; the second v-phase field coil is wound from slot v3 toward slot v4; and the third v-phase field coil is wound from slot v5 toward slot v6. The first w-phase field coil is wound from slot w1 toward slot w2; the second w-phase field coil is wound from slot w3 toward slot w4; and the third w-phase field coil is wound from slot w5 toward slot w6. The field coils 46 are wound in such a manner as to shift in electrical angle by 90°, or to shift by one slot 44 and half in position along direction X, with respect to the corresponding armature coils 30. In a certain structure of the linear motor L, the angle of shift is not necessarily an exact electrical angle of 90°, but may be an electrical angle near 90°. FIG. 4 shows only the stationary-side inclined surface 43, but the stationary-side parallel surface 45 is configured similarly. A field-generating portion 47 is similarly configured on the interior left-hand surface of the casing 20. A configuration of the left-hand field-generating portion 47 is the mirror image of the above-described configuration of the right-hand field-generating portion 41. As described above, in the linear motor L according to the present embodiment, the field magnetic-pole portions 37 and 39 and the field-generating portions 41 and 47 serve in combination as field portions corresponding to the armature portions 25 and 27.

The principle of operation of the linear motor L will next be described. The operation induced between the moving-side inclined surface 6 and the stationary-side inclined surface 7 will be described with reference to FIGS. 3 and 4. The operation induced between the stationary-side parallel surface 26 and the moving-side parallel surface 38 is basically similar to that induced between the inclined surfaces 6 and 7.

First, alternating currents iu, iv, and iw, which are shifted by a phase angle of 120°, flow through the field coils 46. When im represents a maximum current, iu, iv, and iw are represented as follows: iu=im·sinωt; iv=im·sin(ωt−2π/3); and iw=im·sin(ωt−4π/3). As a result of alternating currents iu, iv, and iw flowing through the field coils 46, a north pole for generating magnetic flux Φ directed toward the magnetic element 36a (36c and 36e) of the linear movement body 2 is induced, and a south pole for absorbing magnetic flux Φ directed from the magnetic element 36b (36d and 36f) toward the field-generating portion 41 is induced. In this manner, a relevant magnetic pole emerges in the magnetic elements 36a, 36b, 36c, 36d, . . . The emerging magnetic poles move in axial direction Ds. The same phenomenon also occurs in the field-generating portion 47.

In the magnetic field associated with the magnetic poles (north and south poles) induced on the linear movement body 2 by the field-generating portion 41, magnetic flux is distributed in the form of a sine wave along the direction of linear movement. When the maximum magnetic flux is represented by Φm and the magnetic-pole center is located at θ=0, magnetic flux is represented by Φ=Φm·cos θ. By aligning the magnetic-pole center of the magnetic field induced by each of the field coils 46 with the most readily magnetizable surface of the linear movement portion 2, specifically with a central region of each of the magnetic elements 36a to 36f, through control of alternating currents iu, iv, and iw flowing through the field coils 46, the magnetic elements 36a to 36f of the linear movement body 2 are magnetized in a predetermined direction and at a magnetic flux density approximated by B=Bm·cos θ.

Specifically, the magnetic elements 36a to 36f of the linear movement body 2 are magnetized in predetermined directions according to magnetic poles (north and south poles) induced in each of the field-generating portions 41 . . . As a result, the moving-side magnetic-pole portions 3sa, 3sb, 3sc, . . . , 3ha, 3hb, 3hc, . . . are induced on the outer upper surface of the housing 35. For example, as shown in FIG. 4, when alternating currents iu, iv, and iw flowing through the field coils 46 cause the north pole to be induced in each of the field-generating portions 41 . . . at a region opposite the magnetic element 36a (36c and 36e) and cause the south pole to be induced in each of the field-generating portions 41 . . . at a region opposite the magnetic element 36b (36d and 36f), the magnetic elements 36a to 36f are magnetized in the following manner. The south pole is induced in a surface of the magnetic element 36a (36c and 36e) opposite the corresponding field-generating portion 41 . . . and in a surface of the magnetic element 36b (36d and 36f) opposite the corresponding armature portion 25 . . . Also, the north pole is induced in a surface of the magnetic element 36a (36c and 36e) opposite the corresponding armature portion 25 . . . and in a surface of the magnetic element 36b (36d and 36f) opposite the corresponding field-generating portion 41 . . .

Figure 3:
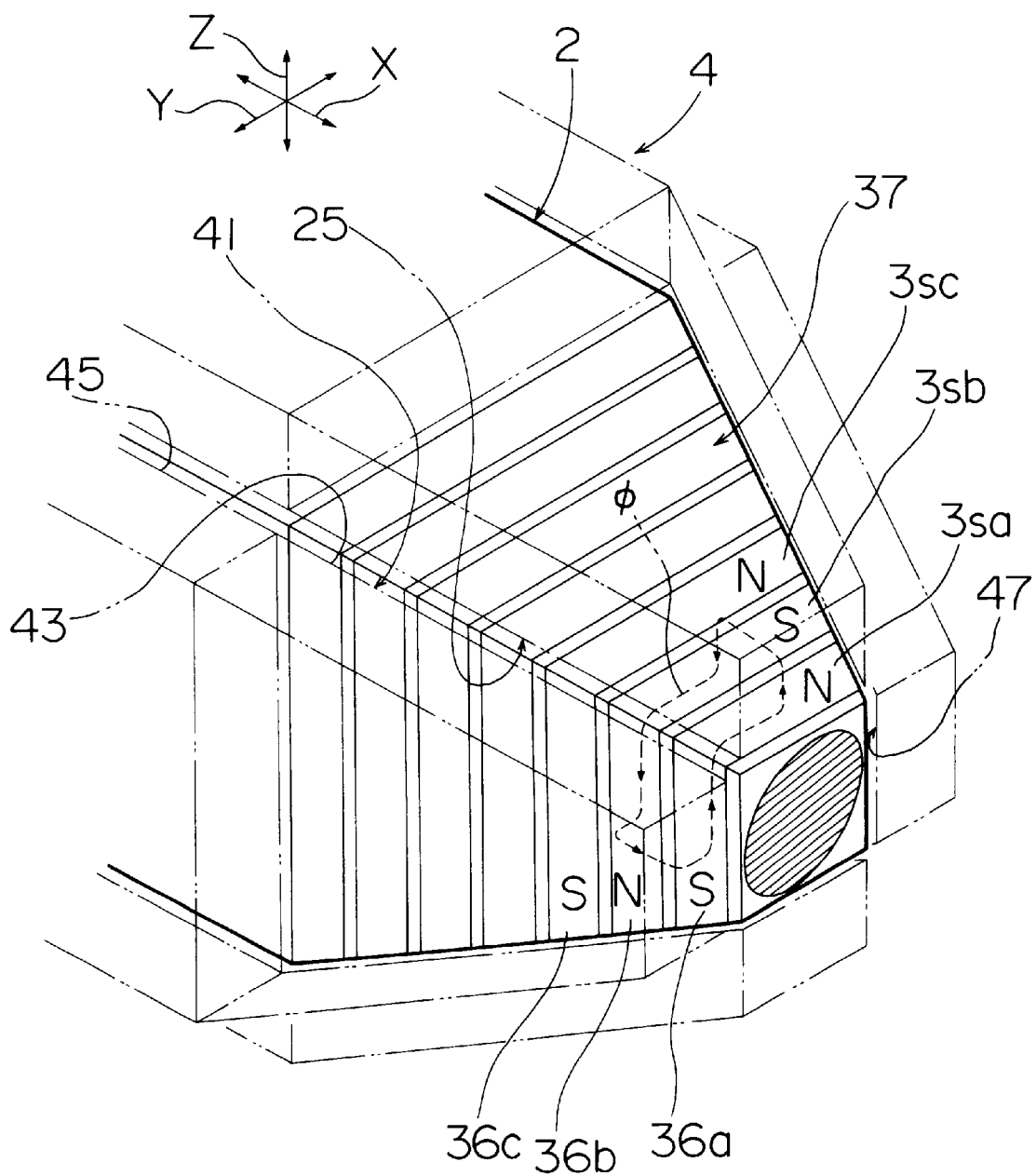
FIG. 3 is a perspective view showing a front portion of the linear movement body of the molding machine of FIG. 1 and a front portion of a stationary body of the molding machine of FIG. 1 represented by an imaginary line.

Further specifically, as shown in FIG. 3, magnetic flux Φ (dotted line) induced from the north-pole region of the field-generating portion 41 passes through the south-pole surface (side surface) of the magnetic element 36a and reaches the interior thereof. The magnetic flux Φ which has reached the interior of the magnetic element 36a passes through the north-pole surface (upper surface) of the magnetic element 36a and reaches the interior of the armature portion 25. The magnetic flux Φ passes through the interior of the armature portion 25 in axial direction Ds and passes through the south-pole surface (upper surface) of the magnetic element 36b, thus reaching the interior of the magnetic element 36b. The magnetic flux Φ which has reached the interior of the magnetic element 36b passes through the north-pole surface (side surface) of the magnetic element 36b and reaches the south-pole region of the field-generating portion 41. FIG. 3 only shows the relationship between the right-hand field-generating portion 41 and the upper armature portion 25. The same relationship is established between the left-hand field-generating portion 47 and the lower armature portion 27. As described above, in the linear motor L, a predetermined closed magnetic circuit is formed by means of the field portions (field-generating portions 41 and 47 and magnetic elements 36a . . . and the armature portions 25 and 27.

Three-phase alternating currents (armature currents) IU, IV, and IW, which are shifted by a phase angle of 120°, flow through the armature coils 30 of the armature portion 25 . . . . When Im represents a maximum current, IU, IV, and IW are represented as follows: IU=Im·sin ωt; IV=Im·sin(ωt−2π/3); and IW=Im·sin(ωt−4π/3). Since the armature coils 30 lead the field coils 46 in phase by an electrical angle of about 90°, torque T (thrust) is generated according to Fleming's rule, so that the linear movement body 2 moves in a predetermined direction. The magnitude of torque T can be controlled simply by controlling the magnitude of current flowing through the field coils 46 and the armature coils 30. Notably, armature current also induces magnetic flux. However, since the housing 35 of the linear movement body 2 is non-magnetic, the linear movement body 2 is less likely to be magnetized; i.e., the linear movement body 2 is less affected by the magnetic flux.

Figure 5:
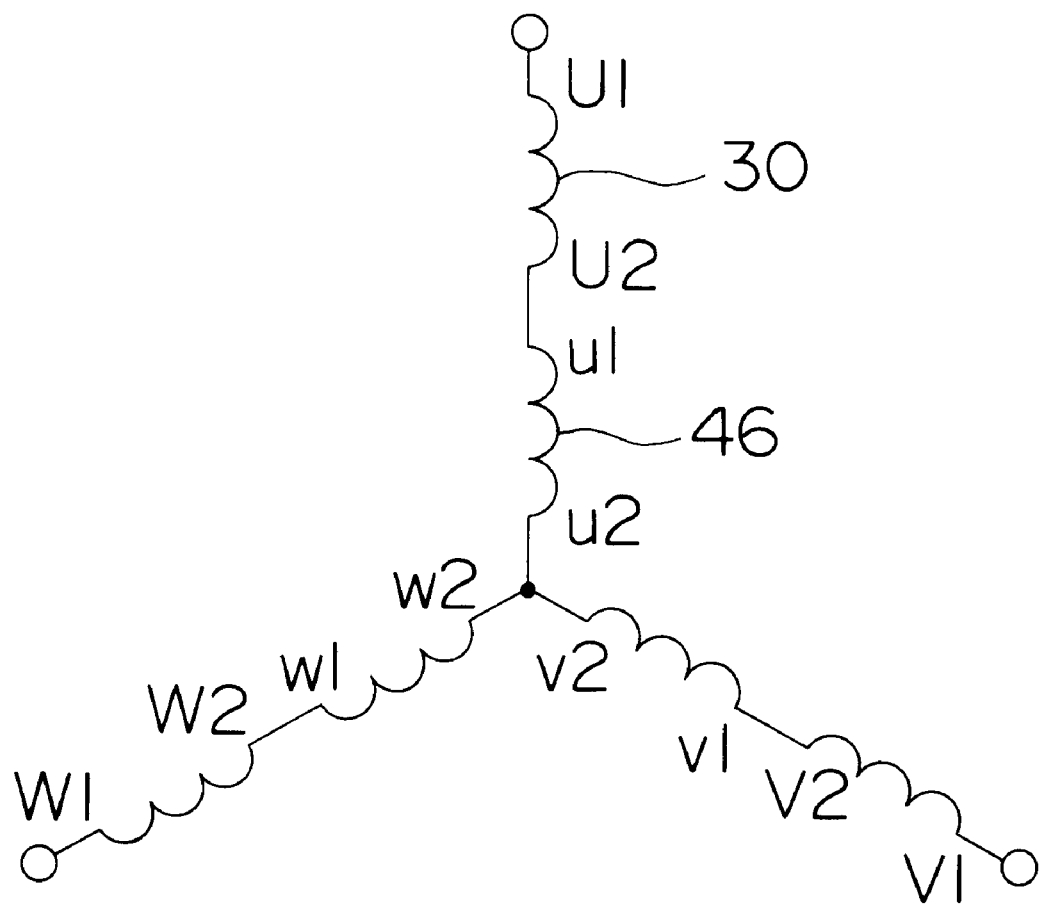
FIG. 5 is a connection diagram of armature coils and field coils in a linear motor of the drive unit of the molding machine of FIG. 1.

FIG. 5 shows how the armature coils 30 and the field coils 46 are connected. When the field coils 46 and the armature coils 30 are mechanically wound such that there exists a phase difference of 90° in electrical angle therebetween as shown in FIG. 4, the armature coils 30 and the field coils 46 can be series-wound. The drive unit 1, therefore, can be controlled as a series-wound AC motor by a single inverter. In this case, the field coils 46 are provided with additional coils for controlling thrust. By controlling the magnitude of field current supplied to the field coils 46 of the right-hand field-generating portion 41 and the magnitude of field current supplied to the field coils 46 of the left-hand field-generating portion 47, a desired thrust can be generated. When the field coils 46 and the armature coils 30 are wound in a mechanically separate manner so as to assume the same phase, separate inverters may be provided and may perform control so as to establish a phase difference of 90° between field current and armature current.

Figure 6:
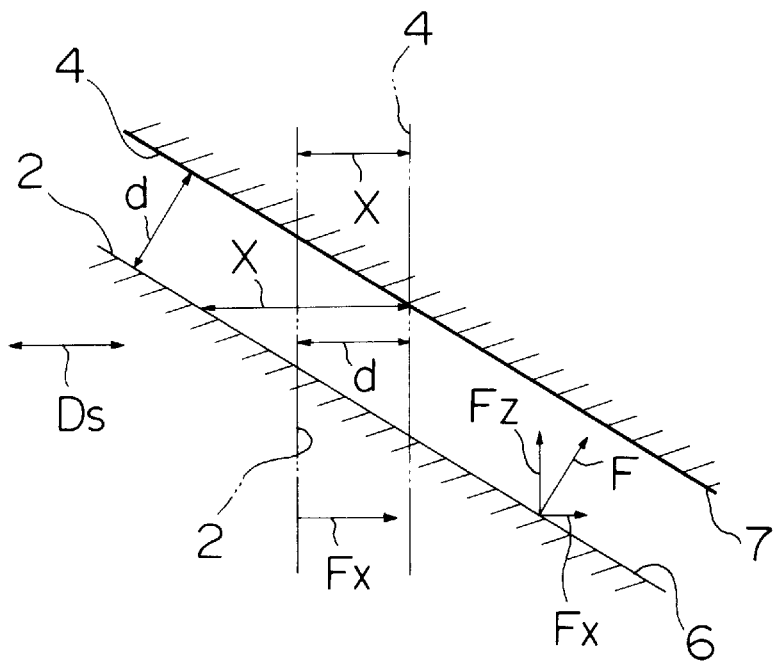
FIG. 6 is a diagram illustrating the principle of the linear motor.

As mentioned previously, the moving-side inclined surface 6 is formed at the front portion of the linear movement body 2, and the moving-side magnetic-pole portions 3sa, 3sb, 3sc . . . are arranged on the moving-side inclined surface 6. The stationary-side inclined surface 7 is formed at the front portion of the stationary body 4 and faces the moving-side inclined surface 6. The stationary-side magnetic-pole portions 5sa, 5sb, 5sc . . . are arranged on the stationary-side inclined surface 7. As a result, as shown in FIG. 6, attractive force F is generated between the linear movement body 2 (moving-side magnetic-pole portions 3sa, 3sb, 3sc, ...) and the stationary body 4 (stationary-side magnetic-pole portions 5sa, 5sb, 5sc, ...). Attractive force F causes generation, on the linear movement body 2, of thrust Fx greater than torque T generated according to Fleming's rule. When an attractive force is simply to be generated on a magnetic circuit, the linear movement body 2 and the stationary body 4 may be arranged so as to face vertical surface-to-vertical surface with respect to axial direction Ds. In this case, however, moving distance X of the linear movement body 2 becomes too short to be practical. Also, control of thrust Fx becomes very difficult.

In the linear motor L of the drive unit 1 of the present embodiment, moving distance X of the linear movement body 2 is greater than gap d between the moving-side inclined surface 6 and the stationary-side inclined surface 7 (i.e., X>d). Thus, excitation current can be reduced, and a characteristic of thrust Fx can be improved.

Figure 7:
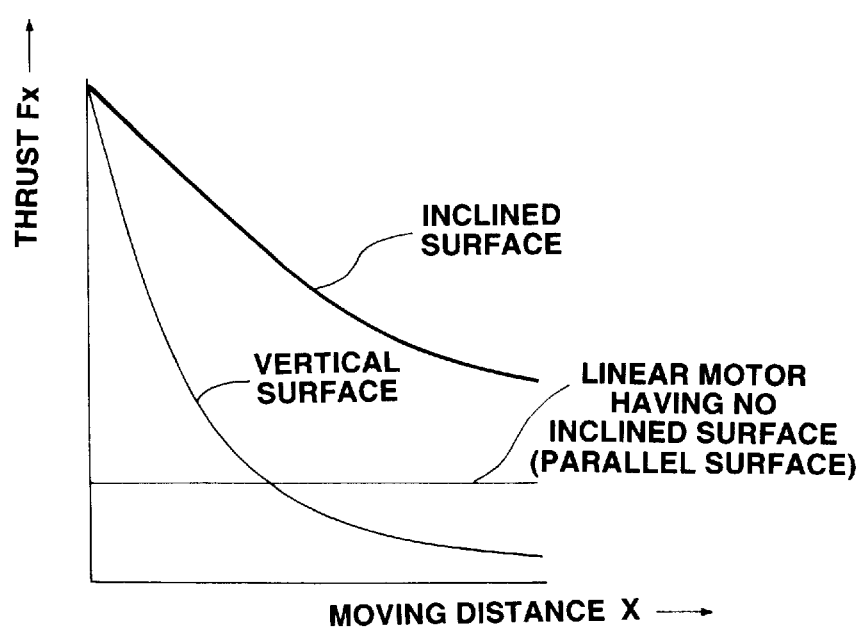
FIG. 7 is a characteristic diagram showing the relationship between axial moving distance and thrust with respect to the linear motor.

FIG. 7 is a characteristic diagram showing the relationship between moving distance X and thrust Fx among the following cases: the linear movement body 2 and the stationary body 4 is arranged such that their opposed surfaces become vertical with respect to axial direction Ds; the inclined surfaces 6 and 7 face each other as in the case of the linear motor L according to the present embodiment; and surfaces parallel to the axial direction Ds are simply provided as in the case of a conventional linear motor. As seen from FIG. 7, in the case where the linear movement body 2 and the stationary body 4 attract each other via the vertical surfaces, thrust Fx decreases abruptly with moving distance X. In the case of the conventional linear motor, thrust Fx is constant irrespective of moving distance X. By contrast, in the case where the inclined surfaces 6 and 7 are employed as in the case of the linear motor L according to the present embodiment, even when moving distance X increases, a reduction in thrust Fx is smaller than in the case where the vertical surfaces are employed. Thrust Fx decreases gently with moving distance X and is sufficiently large as compared to the case of the conventional linear motor. This is because, with a given value of gap d, moving distance X in the case of the inclined surfaces 6 and 7 is longer than that in the case of the vertical surfaces and because an attractive force generated between the linear movement body 2 and the armature and field cores 28 and 42, respectively, is utilized as thrust Fx in contrast to the case of the conventional linear motor where the attractive force is not utilized.

Notably, there are provided an unillustrated control unit for controlling the linear motor L, and unillustrated various sensors, such as a position sensor for detecting position of the movable platen Km, a pressure sensor for detecting pressure imposed on the movable platen Km, and a speed sensor for detecting a moving speed of the movable platen Km.

Next, the operation of the clamping apparatus 1 of the in-line screw injection molding machine M according to the present embodiment will be described with reference to relevant drawings.

It is assumed that the clamping apparatus 1 is in a mold-opened state. During mold closing, the moving-side magnetic-pole portions 3ha ... disposed on the moving-side parallel surfaces 38 and the stationary-side magnetic-pole portions 5ha ... disposed on the stationary-side parallel surfaces 26 operate dominantly, causing the linear movement body 2 (movable platen Km) to advance. Thus, the movable platen Km performs a high-speed mold-closing operation. The unillustrated controller performs feedback control over the movable platen Km with respect to speed, on the basis of a previously set speed and a detected speed of the movable platen Km obtained from an unillustrated speed sensor.

During mold clamping, the moving-side magnetic-pole portions 3sa ... on the moving-side inclined surfaces 6 and the stationary-side magnetic-pole portions 5sa ... on the stationary-side inclined surfaces 7 operate dominantly, thereby applying pressure to the linear movement body 2 (movable platen Km) and thus causing the movable platen Km to perform a high-pressure clamping operation. The unillustrated controller performs feedback control over the movable platen Km with respect to pressure (clamping pressure), on the basis of a previously set pressure and a detected pressure obtained from an unillustrated pressure sensor.

During mold opening, as in the case of mold closing described above, the moving-side magnetic-pole portions 3ha disposed on the moving-side parallel surfaces 38 and the stationary-side magnetic-pole portions 5ha ... disposed on the stationary-side parallel surfaces 26 operate dominantly, causing the linear movement body 2 (movable platen Km) to retreat. Thus, the movable platen Km performs a high-speed mold-opening operation. The unillustrated controller performs feedback control over the movable platen Km with respect to speed, on the basis of a previously set speed and a detected speed of the movable platen Km obtained from an unillustrated speed sensor.

As described above, the drive unit 1 according to the present embodiment includes the linear motor L. The linear motor includes the linear movement body 2 having the moving-side magnetic-pole portions 3sa ..., 3ha ... and supported movably in axial direction Ds, and the stationary body 4 having the stationary-side magnetic-pole portions 5sa ..., 5ha ... adapted to linearly move the linear movement body 2. The linear movement body 2 has the moving-side inclined surfaces 6 on which the moving-side magnetic-pole portions 3sa ... are disposed. The stationary body 4 has the stationary-side inclined surfaces 7 which face the moving-side inclined surfaces 6 and on which the stationary-side magnetic-pole portions 5sa ... are disposed. The linear movement body 2 is connected to the movable platen Km. Thus, clamping pressure can be controlled at high degree of accuracy, and a series of operation during mold clamping can be controlled precisely and smoothly. Also, the number of components can be reduced, thereby enabling the clamping apparatus 1 to assume a simpler, more compact structure. Further, cost reduction can be achieved. Notably, when clamping pressure effected during mold clamping is to be adjusted, the position of the brackets 14b with respect to the tie bars 15 may be adjusted.

The present invention is not limited to the above-described embodiment. Regarding structural details, shape, and any other features, modifications and any omission or addition may be possible as needed without departing from the scope of the invention.

For example, the linear motor L of FIG. 2 is described while mentioning two pairs of armature cores 28 and two pairs of field cores 42 provide around the linear movement body 2. However, the number of armature cores 28 and the number of field cores 42 are not particularly limited. For example, two field cores 42 may be combined with a single armature core 28; a single field core 42 may be combined with two armature cores 28; and three or more armature cores 28 may be combined with three or more field cores 42.

The above embodiment is described while mentioning the inclined surfaces 6 and 7 formed at a front portion of the linear motor L. However, the inclined surfaces 6 and 7 may be formed at a rear or intermediate portion of the linear motor L. The configuration of the linear motor L is not particularly limited, but may be modified in various ways. For example, the linear motor L is described while mentioning the linear movement boy 2 of square cross section and the stationary body 4 of square cross section. However, the linear movement body 2 and the stationary body 4 may assume a polygonal or circular cross section. For example, in the case of the stationary body 4 of circular cross section, the armature portions 25 . . . and the field-generating portions 41 . . . each assume quadrantal cross section. The magnetic elements 36a disposed on the linear movement body 2 may be replaced by magnets. In this case, the field-generating portions of the embodiment shown in FIG. 4 become unnecessary, so that the armature portions 25 . . . can be formed on all of the upper, lower, left-hand, and right-hand sides of the casing 20. Further, a plurality of drive units 1 may be connected together. Torque (pressure) increases with the number of the drive units 1 connected. By selecting an angle of inclination of the inclined surfaces 6 and 7, the magnitude (rate of change) of thrust Fx with respect to moving distance X of the movable body K can be modified accordingly. Herein, the terms "moving-side" and "stationary-side" refer to a relative concept. A "moving-side" element may be stationary, and a "stationary-side" element may be movable. For example, the output shaft may be connected to the stationary body. Such a modification may also be included in the scope of the invention. Also, the clamping apparatus Mc is described while mentioning the output shaft 16 which is directly connected to the movable platen Km serving as the movable body K. However, the output shaft 16 may be connected to the movable platen Km via a toggle mechanism, for example. Also, the movable body K is not particularly limited, but may assume various forms, such as an ejector pin of an ejector.

What is claimed is:

1. A molding machine including a movable body and a drive unit for linearly moving the movable body, said drive unit including a linear motor comprising:

a linear movement body having a moving-side magnetic-pole portion and supported in an axially movable manner, the linear movement body being connected to the movable body; and a stationary body having a stationary-side magnetic-pole portion adapted to linearly move the linear movement body, wherein the linear movement body has a moving-side inclined surface on which part of the moving-side magnetic-pole portion is disposed, and the stationary body has a stationary-side inclined surface which faces the moving-side inclined surface and on which part of the stationary-side magnetic-pole portion is disposed.

2. A molding machine according to claim 1, wherein the stationary body comprises a casing assuming a tubular shape of square cross section, and a front portion of the casing is reduced in size toward a front end thereof to form a tetragonal pyramid.

3. A molding machine according to claim 2, wherein the stationary body has an armature portion serving as the stationary-side magnetic-pole portion on each of two opposed interior surfaces of the casing.

4. A molding machine according to claim 2, wherein the stationary body has a field-generating portion on each of two other opposed interior surfaces of the casing, the field-generating portion being adapted to generate the moving-side magnetic-pole portion through magnetization of the linear movement body.

5. A molding machine according to claim 1, wherein the linear movement body comprises a housing assuming a tubular shape of square cross section, and a front portion of the housing is reduced in size toward a front end thereof to form a tetragonal pyramid, and magnetic elements are arranged at predetermined intervals on an outer surface of the housing.

6. A molding machine according to claim 1, wherein the movable body is a movable platen of a clamping apparatus of an injection molding machine.

* * * * *